United States Patent
Wittevrongel et al.

(10) Patent No.: US 11,604,679 B2
(45) Date of Patent: Mar. 14, 2023

(54) DYNAMIC WORKLOAD SHIFTING WITHIN A CONNECTED VEHICLE

(71) Applicant: Lytx, Inc., San Diego, CA (US)

(72) Inventors: Jeremiah Todd Wittevrongel, San Diego, CA (US); Marc Ische, San Diego, CA (US); Daniel Lambert, Carlsbad, CA (US); Stephen Krotosky, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 302 days.

(21) Appl. No.: 17/016,201

(22) Filed: Sep. 9, 2020

(65) Prior Publication Data
US 2022/0075656 A1 Mar. 10, 2022

(51) Int. Cl.
*G06F 9/50* (2006.01)
*G07C 5/00* (2006.01)
*G07C 5/08* (2006.01)

(52) U.S. Cl.
CPC ............ *G06F 9/5011* (2013.01); *G07C 5/008* (2013.01); *G07C 5/08* (2013.01); *G07C 5/085* (2013.01)

(58) Field of Classification Search
CPC ......... G06F 9/5011; G07C 5/008; G07C 5/08; G07C 5/085

USPC .......................................................... 718/104
See application file for complete search history.

(56) References Cited

U.S. PATENT DOCUMENTS

| 9,268,604 | B1 | 2/2016 | Herzberg | |
|---|---|---|---|---|
| 2015/0112542 | A1* | 4/2015 | Fuglewicz | G07C 5/0858 701/1 |
| 2020/0128066 | A1 | 4/2020 | Sugimoto | |

FOREIGN PATENT DOCUMENTS

| CN | 107025763 A | * | 8/2017 | .......... G07C 5/0841 |
|---|---|---|---|---|
| JP | 2009111803 A | * | 5/2009 | |

* cited by examiner

*Primary Examiner* — Mahmoud Gimie
(74) *Attorney, Agent, or Firm* — Van Pelt, Yi & James LLP (57) ABSTRACT

A system for dynamic job shifting includes an interface and a processor. The interface is configured to receive a job request to perform a job. The processor is configured to monitor available resources for performing the job. The available resources include a set of vehicle carried systems accessible to a vehicle event recorder via a communication link. The vehicle event recorder is coupled to a vehicle. The processor is further configured to determine a vehicle carried system of the set of vehicle carried systems for performing the job; provide the job to the vehicle carried system, where the job is configured to create one or more checkpoint data files; and receive an indication of creation of a checkpoint data file of the one or more checkpoint data files.

16 Claims, 11 Drawing Sheets

DYNAMIC WORKLOAD SHIFTING WITHIN A CONNECTED VEHICLE

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of an anomalous event (e.g., a sudden stop, a hard maneuver, a collision, etc.). The vehicle event recorder is capable of performing various data processing tasks for identification of anomalous events—for example, filtering data, analyzing data, performing image recognition algorithms, analyzing data using a machine learning algorithm or a neural network, etc. In some situations, processing capability of the vehicle event recorder is limited, for example, either as a result of a cost limitation (e.g., necessitating the use of an inexpensive processor) or a thermal limitation (e.g., limiting the processing power the processor is able to access). This creates a problem wherein it is desirable to enable the vehicle event recorder to access powerful algorithms but the necessary processor capability is not available.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic workload shifting within a connected vehicle is disclosed. A vehicle event recorder system coupled to a vehicle for dynamic workload shifting comprises an interface and a processor. The interface is configured to receive a job request to perform a job. The processor is configured to monitor available resources for performing the job, wherein available resources comprise a set of vehicle carried systems accessible to the vehicle event recorder via a communication link, determine a vehicle carried system of the set of vehicle carried systems for performing the job, provide the job to the vehicle carried system, wherein the job is configured to create one or more checkpoint data files, and receive an indication of creation of a checkpoint data file of the one or more checkpoint data files.

A system for dynamic workload shifting within a connected vehicle comprises a vehicle event recorder (VER) system mounted in a vehicle. The VER is in communication with a set of sensors—for example, video sensors, audio sensors, one or more accelerometers, a global positioning system (e.g., GPS), one or more gyroscopes, etc. The VER is capable of performing data analyses on sensor data—for example, in order to identify an anomalous event (e.g., an accident), to determine driver data (e.g., determining a driver skill level, identifying dangerous driver behavior, etc.), to catalog vehicle observations (e.g., performing image recognition on objects seen in the course of business), etc. The VER is typically mounted on the vehicle rear-view mirror in order to allow it a clear view of both the road ahead (via a forward facing camera) and the cabin (via an inward facing camera). Positioning the VER on the rear view mirror puts it near or in contact with the windshield, limiting the maximum temperature the VER can reach safely. In the event the VER has a job to execute requiring large amounts of processing power, the VER may not be able to run the job.

The system for dynamic workload shifting within a connected vehicle (e.g., a main vehicle, a trailer, a cargo area, etc.) allows the VER to access the processing power of one or more vehicle carried systems when necessary. Vehicle carried systems comprise systems carried by the vehicle (e.g., the same vehicle the VER is mounted on, where the same vehicle includes a main vehicle, a trailer, a cargo area, etc.) and in close enough proximity to the VER for a network connection to be established. For example, a vehicle carried system comprises a smartphone in the possession of the vehicle driver, a tablet computing device mounted on the vehicle dash, an auxiliary computing system mounted in the vehicle, trailer, or cargo area for providing the VER with extra processing capability, etc. The vehicle carried system includes a user installed app for executing jobs provided to the vehicle carried system by the VER. The user installed app is configured to executed jobs using a secured virtual machine, allowing safe execution of VER code. The user installed app provides a status update message to the VER, including device metadata, device capabilities, device loading, device current jobs, etc.

Job dispatching software on the VER receives a job request to perform a job and determines a system for performing the job. Available resources for performing the job comprising a set of vehicle carried systems accessible via a communication link are monitored. For example, monitoring the set of vehicle carried systems comprises receiving status update messages from the vehicle carried systems and storing status information from the status update messages in a vehicle carried system database. In the event it is determined not to perform the job on the VER (e.g., because resources are not available on the VER, because the system is configured to perform jobs on vehicle carried systems by default, etc.), a vehicle carried system of the set of vehicle carried systems is determined for performing the job. For example, vehicle carried systems able to complete the job are determined (e.g., vehicle carried systems able to complete the job comprise vehicle carried systems with the required resources—for example, a processor of a required capability, a graphics processing unit (e.g., a GPU), a required capacity of random access memory (RAM), etc.). Of the vehicle carried systems able to complete the job, one is selected based at least in part on an availability model (e.g., a model indicating how likely the vehicle carried system is to be available for the duration of the job) and cost-effectiveness. For example, the model looks at the historical data for a device and determines a probability that the device is available for the estimated execution time of the job and in the event that the probability is greater than a threshold probability indicates that the device is available to process the job. The job is provided to the selected vehicle carried system, where it is caused to be executed. As the job is executed, checkpoint data files are generate by the job and stored by the vehicle carried system. A checkpoint data file comprises an intermediate job data file or a job completion result. For example, a portable checkpoint data file comprises an intermediate job data file for allowing the job to be resumed on another device (e.g., in the event job completion fails and another device is available to execute the job), and a non-portable checkpoint data file comprises an intermediate job data file for allowing the job to be resumed on the same device (e.g., in the event intermediate job data requires storage of device-specific information). Portable checkpoint data files are provided to the VER system.

The system for dynamic workload shifting within a connected vehicle improves the computer by allowing a VER system to take advantage of local processing capability to execute processor intensive jobs. The VER system is therefore able to execute more jobs and more processor intensive jobs than would have been possible beforehand given its limitations on cost and thermal budget. In addition, local computing resources of the VER are less expensive than network accessible computing resources (e.g., cloud resources accessible by a cellular network) both in terms of computation and communication bandwidth making the system also more efficient economically.

Figure 1:
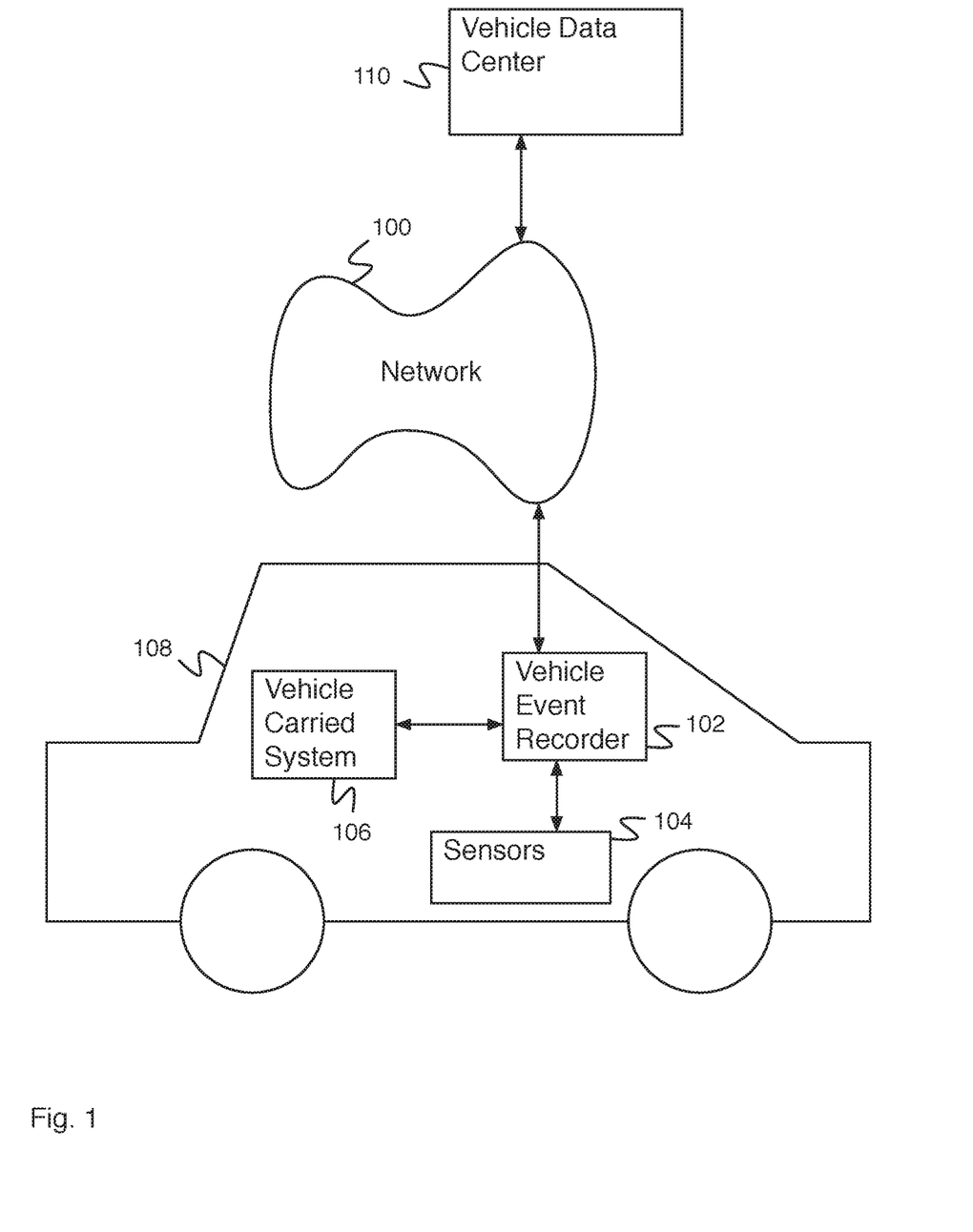
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck).

Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night). Vehicle event recorder 102 communicates with vehicle data center 110 via network 100. Vehicle data center comprises a computing system for storing data, processing data, providing data to a manager, providing data for human review, exchanging data between multiple vehicle event recorder systems, etc. In various embodiments, the data center comprises a company owned/operated data center, a cloud data center, or a combination of one or more company owned/operated data center and one or more cloud data centers, or any other appropriate configuration of data centers.

Vehicle event recorder 102 is in communication with vehicle sensors 104 and vehicle carried system 106. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), advanced driver assistance system (ADAS) sensors, a GPS, outdoor temperature sensors, moisture sensors, line tracker sensors (e.g., laser line tracker sensors), a lane change sensor, etc. Vehicle state sensors comprise internal vehicle state sensors, for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 108 in any appropriate location—for example, the chassis, the front grill, the dashboard, the rear-view mirror, the rear window or wall, the floor, etc. In some embodiments, the rear-view mirror comprises the most practical mounting point for vehicle event recorder 102. There are times when vehicle event recorder 102 comprises multiple units mounted in different locations within vehicle 108 instead of a single unit, particularly when there are space constraints for a given location (e.g., behind the rear view mirror) and more space is required to house electronic components. In some embodiments, the system for dynamic workload shifting within a connected vehicle is used to provide jobs to auxiliary units of vehicle event recorder 102. Vehicle carried system 106 comprises a computer system carried by vehicle 108 and accessible via a local communication link by vehicle event recorder 102. For example, vehicle carried system 106 comprises a mobile system, a smartphone belonging to a driver, a tablet computer belonging to a vehicle fleet service, an auxiliary computing device associated with vehicle event recorder 102, etc.

Vehicle carried system 106 comprises a system carried along with the vehicle—for example, a tablet, a cell phone, a portable computer, a portable measurement device, a portable recorder, or any other appropriate device with a processor. Vehicle carried system 106 may be placed or stowed within the vehicle passenger area, in a storage area, in a trailer or cargo area, or any other area of the vehicle and/or connected to the vehicle.

Vehicle event recorder 102 comprises a system for dynamic workload shifting within a connected vehicle. For example, vehicle event recorder 102 comprises an interface configured to receive a job request to perform a job, and a processor configured to monitor available resources for performing the job, wherein available resources comprise a set of vehicle carried systems accessible via a communication link, determine a vehicle carried system of the set of vehicle carried systems for performing the job, provide the job to the vehicle carried system, wherein the job is configured to create one or more checkpoint data files, and receive an indication of creation of a checkpoint data file of the one or more checkpoint data files.

Figure 2:
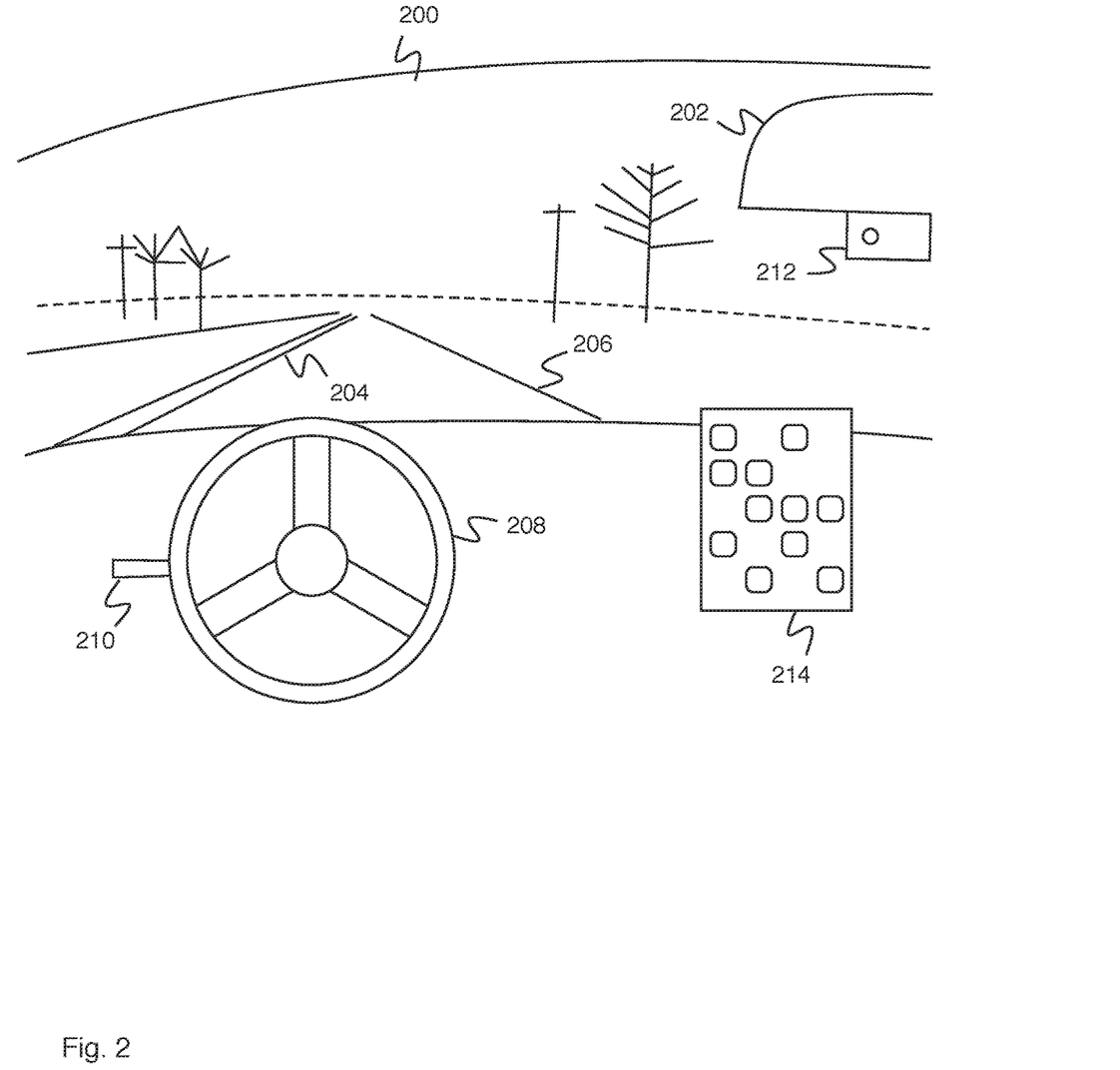
FIG. 2 is a diagram illustrating an embodiment of a vehicle cabin.

FIG. 2 is a diagram illustrating an embodiment of a vehicle cabin. In some embodiments, the diagram of FIG. 2 illustrates a driver view. In the example shown, a front view is seen via windshield 200 and a rear view is seen via rear view mirror 202. Through windshield 200 the driver is able to see the road, other cars, signs, stop lights, etc. Center line 204 and shoulder line 206 are visible to the driver through windshield 200. In some embodiments, center line 204 and shoulder line 206 comprise lane markers. In various embodiments, the driver uses the view of center line 204 and shoulder line 206 for determining a lane position, for guiding the path of a turn, for determining the legality of a lane change, or for any other appropriate purpose. In some embodiments, center line 204 and shoulder line 206 are visible to a forward facing camera (e.g., a forward facing camera of vehicle event recorder 212). In various embodiments, a forward facing camera uses a view of center line 204 and shoulder line 206 for determining a lane position, for determining whether the vehicle is turning, for determining a driver steadiness (e.g., whether the driver drives steadily or weaves within the lane), for determining a risky behavior (e.g., rolling through a stop sign, running a light, hazardous cornering, hard braking, etc.), or for any other appropriate purpose. The vehicle cabin of FIG. 2 additionally comprises steering wheel 208 (e.g., for steering the vehicle) and turn signal indicator 210 (e.g., for indicating an intention to turn). Rear view mirror 202 comprises a mirror for providing a driver a rear view behind the vehicle. A rear view is visible to a rearward facing camera (e.g., a rearward facing camera of vehicle event recorder 212). A cabin view (e.g., a view of the interior of the vehicle cabin) is visible to an inward facing camera (e.g., an inward facing camera of vehicle event recorder 212). In some embodiments, an inward facing camera is used for capturing a driver image. For example, a driver image from an inward facing camera is used for identification of a risky behavior (e.g., eating, drinking, smoking, cell phone use, etc.). Vehicle event recorder 212 is mounted to rear view mirror 202. For example, vehicle recorder 212 is mounted to rear view mirror 202 such that it simultaneously has a forward, rearward, and inward facing view. Vehicle event recorder 212 comprises a system for receiving data, storing data, processing data, etc. Vehicle event recorder 212 is in communication with vehicle carried system 214. In the example shown, vehicle carried system 214 comprises a tablet computing system for use by the driver (e.g., for accessing route information, stop information, cargo information, pace information, communication systems, etc.). Vehicle event recorder 212 comprises a system for dynamic workload shifting within a connected vehicle. For example, vehicle event recorder system provides computing jobs to vehicle carried system 214 and/or any other vehicle carried system present in the vehicle of FIG. 2 (e.g., a smartphone, tablet, and/or portable computer carried by the driver, any additional auxiliary computing systems, etc.).

Figure 3:
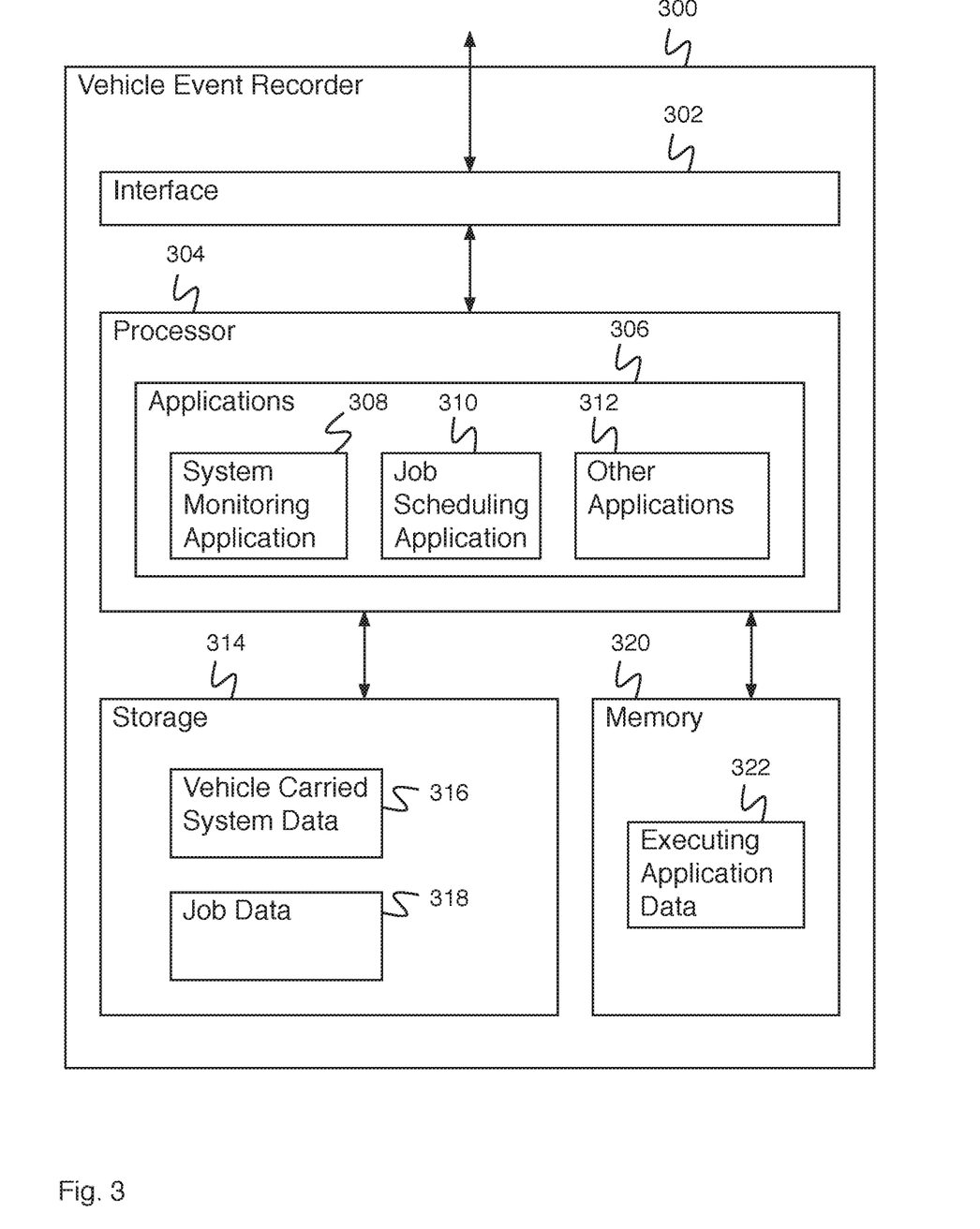
FIG. 3 is a block diagram illustrating an embodiment of a vehicle event recorder.

FIG. 3 is a block diagram illustrating an embodiment of a vehicle event recorder. In some embodiments, vehicle event recorder 300 comprises vehicle event recorder 102 of FIG. 1. Vehicle event recorder 300 comprises one or more computers mounted in a vehicle (e.g., one or more computers communicating via a wired or wireless communication link). In the example shown, vehicle event recorder 300 comprises interface 302. For example, interface 302 comprises an interface for receiving sensor data, receiving a request to execute a job, providing a communications link, receiving network communications, providing an indication of an anomalous event, providing sensor data, providing network communications, providing coaching information, etc. Processor 304 comprises a processor for executing applications 306.

Applications 306 comprise system monitoring application 308, job scheduling application 310, and other applications 312. System monitoring application 308 comprises an application for monitoring the status of one or more vehicle carried systems. For example, system monitoring application 308 receives status update messages from one or more vehicle carried systems, extracts status information, and stores status information in vehicle carried system data 316. Job scheduling application 310 comprises an application for job scheduling. For example, job scheduling application 310 comprises an application for determining a vehicle carried system for executing a job (e.g., based at least in part on vehicle carried system data 316), provide the job to the vehicle carried system, monitor the job while it is executing, relocating a job if the job is not executing appropriately, and receiving job results upon successful execution. Vehicle event recorder 300 comprises a system for dynamic workload shifting within a connected vehicle, comprising an interface configured to receive a job request to perform a job, and a processor configured to monitor available resources for performing the job, wherein available resources comprise a set of vehicle carried systems accessible via a communication link, determine a vehicle carried system of the set of vehicle carried systems for performing the job, provide the job to the vehicle carried system, wherein the job is configured to create one or more checkpoint data files, and receive an indication of creation of a checkpoint data file of the one or more checkpoint data files. Other applications 312 comprise any other appropriate applications (e.g., a communications application, a data storage and retrieval application, a web browser application, a user interface application, a data analysis application, etc.). Storage 314 comprises vehicle carried system data 316 (e.g., status update data received from one or more vehicle carried systems) and job data 318 (e.g., data describing jobs executed by vehicle event recorder 300 and one or more vehicle carried systems, checkpoint data files, historical job execution data, etc.). Memory 320 comprises executing application data 322 comprising data associated with applications 306.

Figure 4:
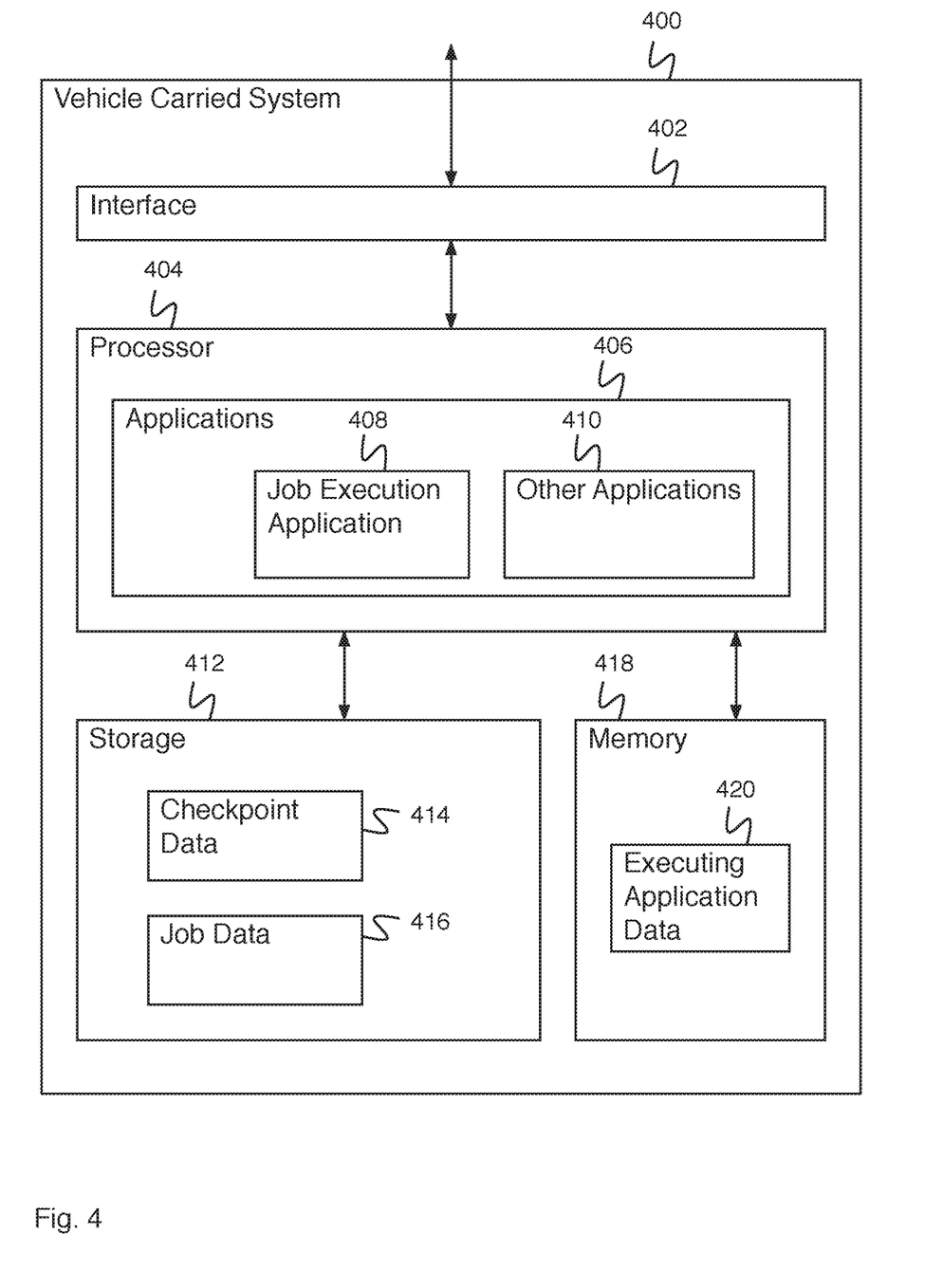
FIG. 4 is a block diagram illustrating an embodiment of a vehicle carried system.

FIG. 4 is a block diagram illustrating an embodiment of a vehicle carried system. In some embodiments, vehicle carried system 400 comprises vehicle carried system 106 of FIG. 1. In the example shown, vehicle carried system 400 comprises interface 402. For example, interface 402 comprises an interface for receiving a request to execute a job, providing monitoring information, providing a checkpoint data file, providing job completion results, etc. Processor 404 comprises a processor for executing applications 406. Applications 406 comprise job execution application 408 and other applications 410. Job execution application 408 comprises an application for executing jobs provided to vehicle carried system 400 by a vehicle event recorder. In some embodiments, vehicle carried system 400 communicates with a vehicle event recorder via a secured network. Vehicle carried system 400 stores a certificate provided by a trusted certificate authority (e.g., a vehicle event recorder provider) and provides the certificate as proof of its credibility to join the secured network. Job execution application 408 additionally comprises an application for providing status updates to a vehicle event recorder. For example, status updates comprise one or more of a device identifier, a device type, a device location within a carrying vehicle, a device operating temperature, device CPU resource availability, device GPU resource availability, device DSP resource availability, device volatile memory capacity, device volatile memory availability, device non-volatile storage capacity, device non-volatile storage availability, device non-volatile storage security attributes, device jobs in progress list, device jobs in progress percentage complete, or device jobs in progress checkpoint data files, or any other appropriate status update data. In some embodiments, job execution application 408 comprises a user installed app (e.g., an app installed on vehicle carried system by a user, for example, a vehicle driver, for the purpose of enabling the vehicle carried system to execute jobs provided by a vehicle event recorder). In some embodiments, job execution application 408 executes a job using a secured virtual machine (e.g., an encrypted virtual machine for isolating job data from other processes on vehicle carried system 400). Other applications 410 comprise any other appropriate applications (e.g., a communications application, a data storage and retrieval application, a web browser application, a user interface application, a data analysis application, etc.). Storage 412 comprises checkpoint data 414 (e.g., portable checkpoint data files and non-portable checkpoint data files) and job data 416 (e.g., data describing jobs executed by vehicle carried system 400, job completion data, etc.). Memory 418 comprises executing application data 420 comprising data associated with applications 406.

In various embodiments, vehicle carried system 400 notifies a vehicle event recorder of its status, receives a request to perform a job using available processing and memory resources, provides updates to job execution (e.g., by providing indication of status), stores and/or provides check point files (e.g., for local or remote resumption of execution), provides execution results to the vehicle event recorder, or performs any other appropriate task.

Figure 5:
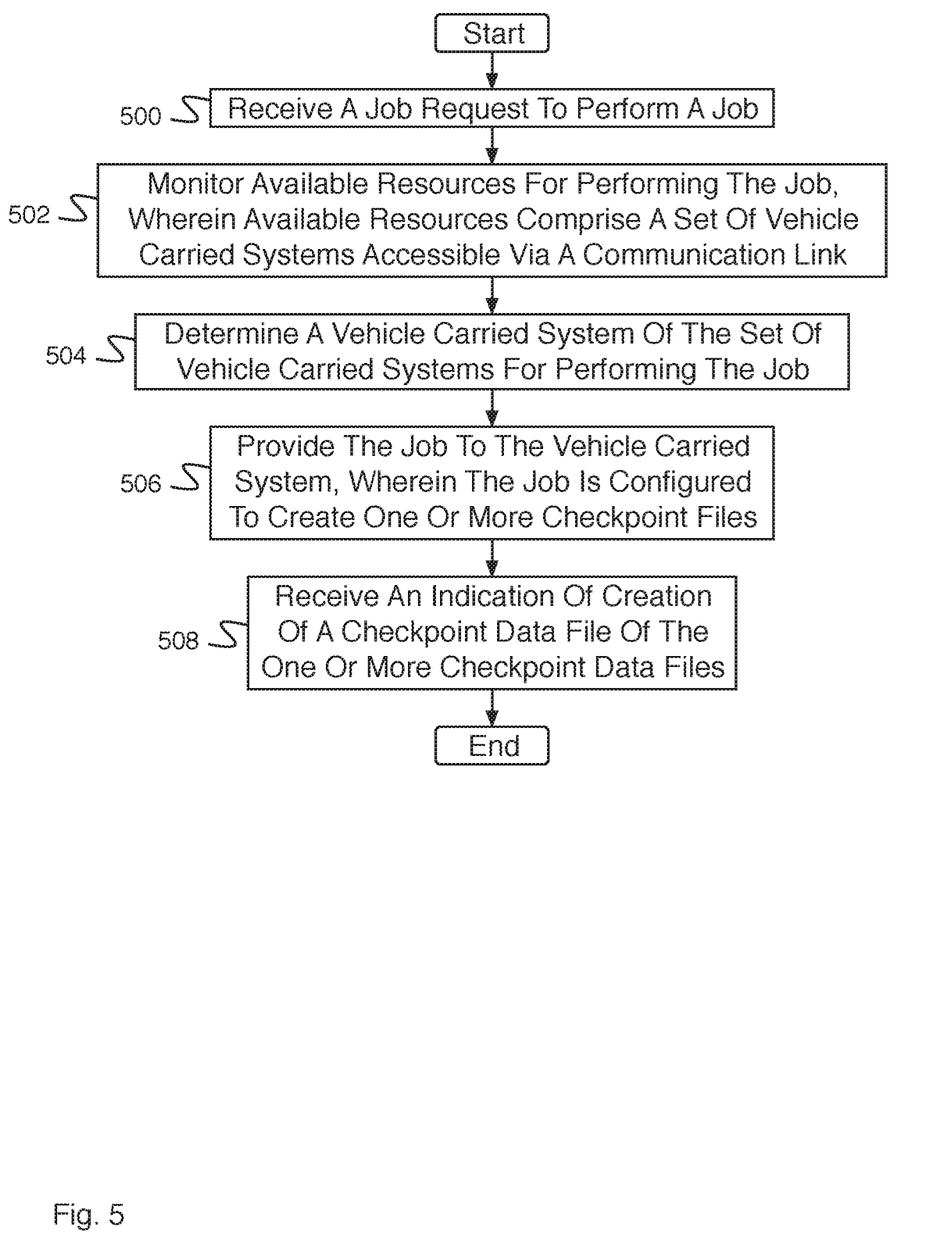
FIG. 5 is a flow diagram illustrating an embodiment of a process for dynamic workload shifting within a connected vehicle.

FIG. 5 is a flow diagram illustrating an embodiment of a process for dynamic workload shifting within a connected vehicle. In some embodiments, the process of FIG. 5 is executed by vehicle event recorder 102 of FIG. 1. In the example shown, in 500, a job request to perform a job is received. In some embodiments, the job request is received from another process on the vehicle event recorder—for example, a data processing process, an image identification process, a behavior identification process, etc. In 502, available resources for performing the job are monitored, wherein available resources comprise a set of vehicle carried systems accessible via a communication link. For example, the available memory and/or processing resources available on a vehicle carried system are gathered by the vehicle event recorder to store and be used to determine available systems for performing tasks. In some embodiments, the communication link comprises a networking communication link provided by the vehicle event recorder (e.g., an encrypted WiFi network, an unencrypted WiFi network, a point-to-point communication link, etc.). In 504, a vehicle carried system of the set of vehicle carried systems for performing the job is determined. For example, the database is searched to match a job that is desired to be processed and processing resources available in vehicle carried systems. In some embodiments, the resources available for use are stored in a database that is search to match the job with available resources. In various embodiments, the available resource with the most available processing or memory resource is selected, the available resource with the best communication link bandwidth is selected, the available resource with the least available processing or memory resource that is able to perform the job is selected, or any other appropriate selection criteria is used to select the available resource. In 506, the job is provided to the vehicle carried system, wherein the job is configured to create one or more checkpoint files. For example, the vehicle event recorder provides the code and/or data to the vehicle carries system to perform the job, and the job is executed. In 508, an indication of creation of a checkpoint data file of the one or more checkpoint data files is received. For example, a compact set of data is received or an indication of a compact set of data is received related to the execution of the job. In various embodiments, model parameters, neural network nodes, data pointers, iteration metadata, or any other appropriate data are received or an indication of storage is received. In various embodiments, the checkpoint data file is received, the checkpoint data file is stored by the vehicle carried system accessible to the vehicle event recorder, the checkpoint data file is received at a later time, the checkpoint data file is received as part of a status update message, the checkpoint data file comprises a portable checkpoint data file, the checkpoint data file comprises a non-portable checkpoint data file, the checkpoint data file comprises job completion data, etc.

Figure 6:
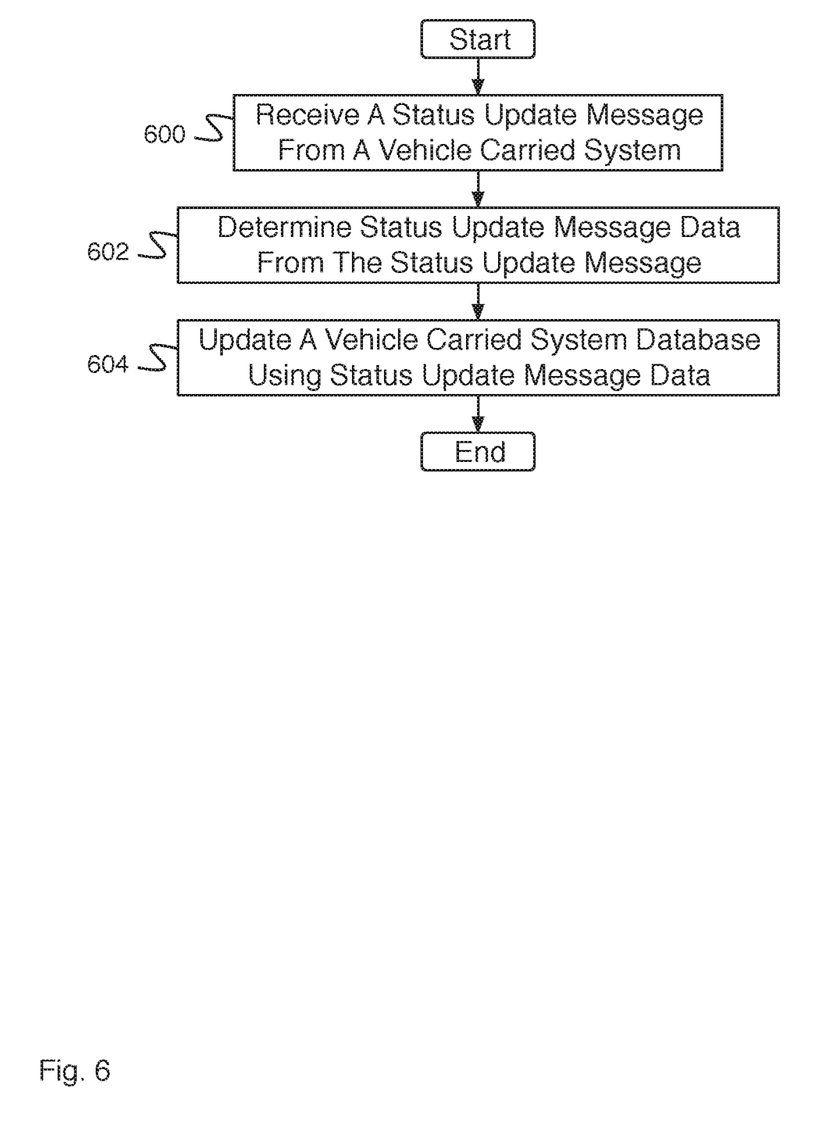
FIG. 6 is a flow diagram illustrating an embodiment of a process for monitoring available resources for performing a job.

FIG. 6 is a flow diagram illustrating an embodiment of a process for monitoring available resources for performing a job. In some embodiments, the process of FIG. 6 implements 502 of FIG. 5. In the example shown, in 600, a status update message is received from a vehicle carried system. In various embodiments, a vehicle carried system is configured to provide a status update message to the vehicle event recorder once a second, once a minute, once every 10 minutes, once an hour, once every four hours, once a day, or at any other appropriate frequency. In 602, status update message data is determined from the status update message. For example, status update message data comprises one or more of a device identifier, a device type, a device location within a carrying vehicle, a device operating temperature, device CPU resource availability, device GPU resource availability, device DSP resource availability, device volatile memory capacity, device volatile memory availability, device non-volatile storage capacity, device non-volatile storage availability, device non-volatile storage security attributes, device jobs in progress list, device jobs in progress percentage complete, device jobs in progress checkpoint data files, or any other appropriate status update message data. In 604, a vehicle carried system database (e.g., a database storing data describing one or more vehicle carried systems) is updated using status update message data. For example, the status data is summarized or stored as a whole in the vehicle carried system database so that available resources can be identified by scanning the database. In some embodiments, the status data is used to determine a time history of likely availability of resources (e.g., whether the device resources are likely to be available for a period of time).

Figure 7:
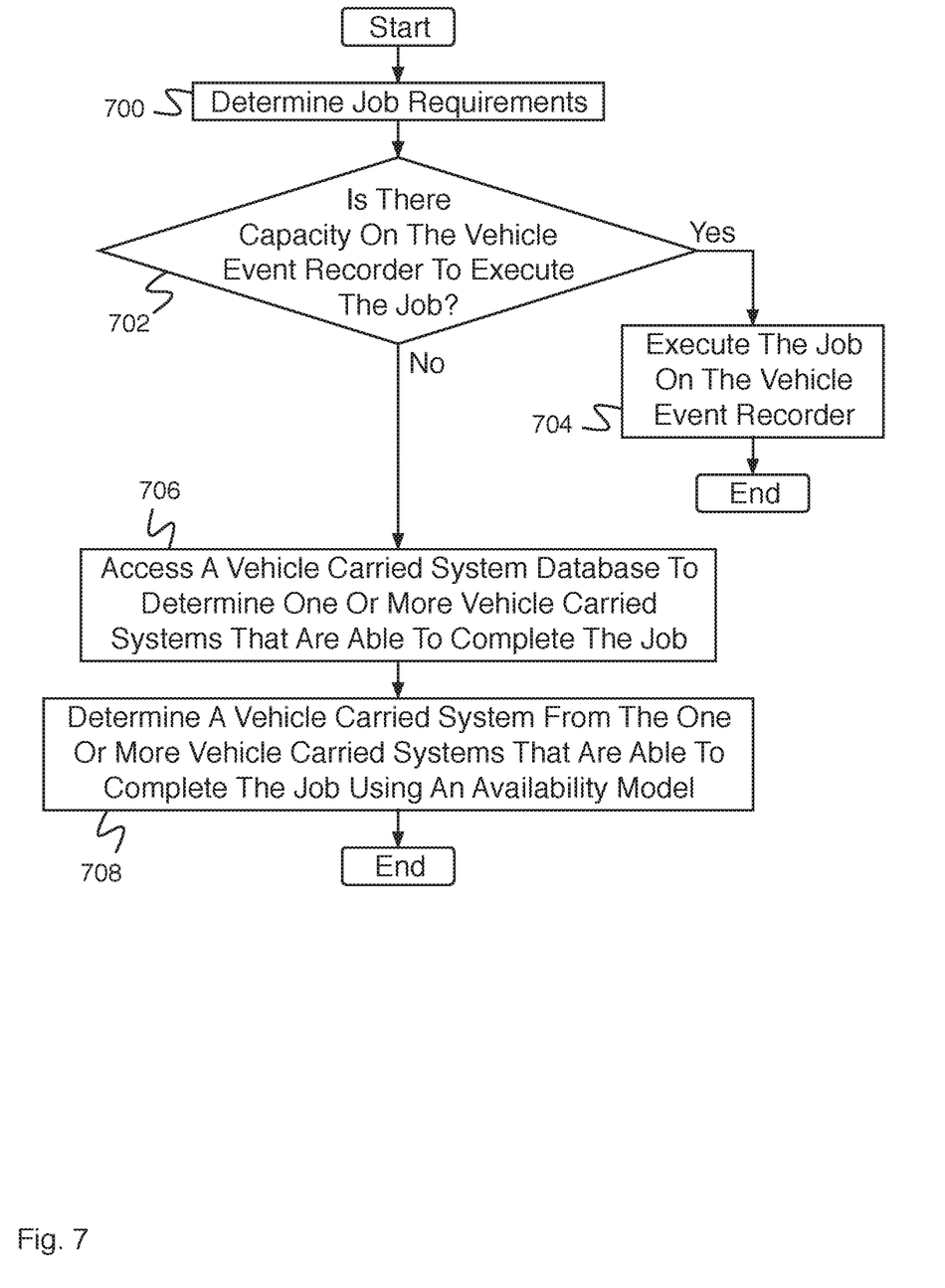
FIG. 7 is a flow diagram illustrating an embodiment of a process for determining a vehicle carried system of a set of vehicle carried systems for performing a job.

FIG. 7 is a flow diagram illustrating an embodiment of a process for determining a vehicle carried system of a set of vehicle carried systems for performing a job. In some embodiments, the process of FIG. 7 implements 504 of FIG. 5. In the example shown, in 700, job requirements are determined. For example, job requirements comprise a required processor (e.g., CPU) type, a required CPU power, a required number of CPUs, a required CPU availability, a graphics processor unit (e.g., GPU) requirement, a GPU availability requirement, a required random access memory (e.g., volatile memory) capacity, a required random access memory speed, a required random access memory availability, a required non-volatile memory capacity, a required non-volatile memory availability, required device non-volatile memory security attributes (e.g., encrypted storage), an expected required availability time, etc. In 702, it is determined whether there is capacity on the vehicle event recorder to execute the job. For example, determining whether there is capacity on the vehicle event recorder to execute the job comprises whether the vehicle event recorder meets the job requirements determined in 700. In the event it is determined that there is capacity on the vehicle event recorder to execute the job, control passes to 704. In 704, the job is executed on the vehicle event recorder, and the process ends. In some embodiments, the job is first indicated to be executed on the vehicle event recorder then the job is queued to be executed on the vehicle event recorder, and then the job is executed in the vehicle event recorder. In the event it is determined in 702 that there is not capacity on the vehicle event recorder to execute the job, control passes to 706. In 706, a vehicle carried system database is accessed to determine one or more vehicle carried systems that are able to complete the job. For example, one or more vehicle carried systems that satisfy the job requirements are determined (e.g., one or more vehicle carried systems are determined based at least in part on processor availability, processor load, memory availability, storage availability, encrypted storage availability, etc.). In some embodiments, in the event that no vehicle carried systems are able to complete the job, a remote system for performing the job is determined. For example, a remote system comprises a system accessible via a network (e.g., network 100 of FIG. 1). In some embodiments, in the event that no vehicle carried systems are able to complete the job, an indication is provided that capacity for performing the job is not available. In 708, a vehicle carried system is determined from the one or more vehicle carried systems that are able to complete the job. For example, the vehicle carried system is determined based at least in part on an availability model. In some embodiments, a ranked list of available resources is determined and a top available vehicle carried system is selected from the ranked list. An availability model comprises a model for indicating whether a vehicle carried system is expected to be available for an expected required availability time. In some embodiments, the vehicle carried system is determined based at least in part on a cost-effectiveness (e.g., some devices incur a greater cost than others to access).

Figure 8:
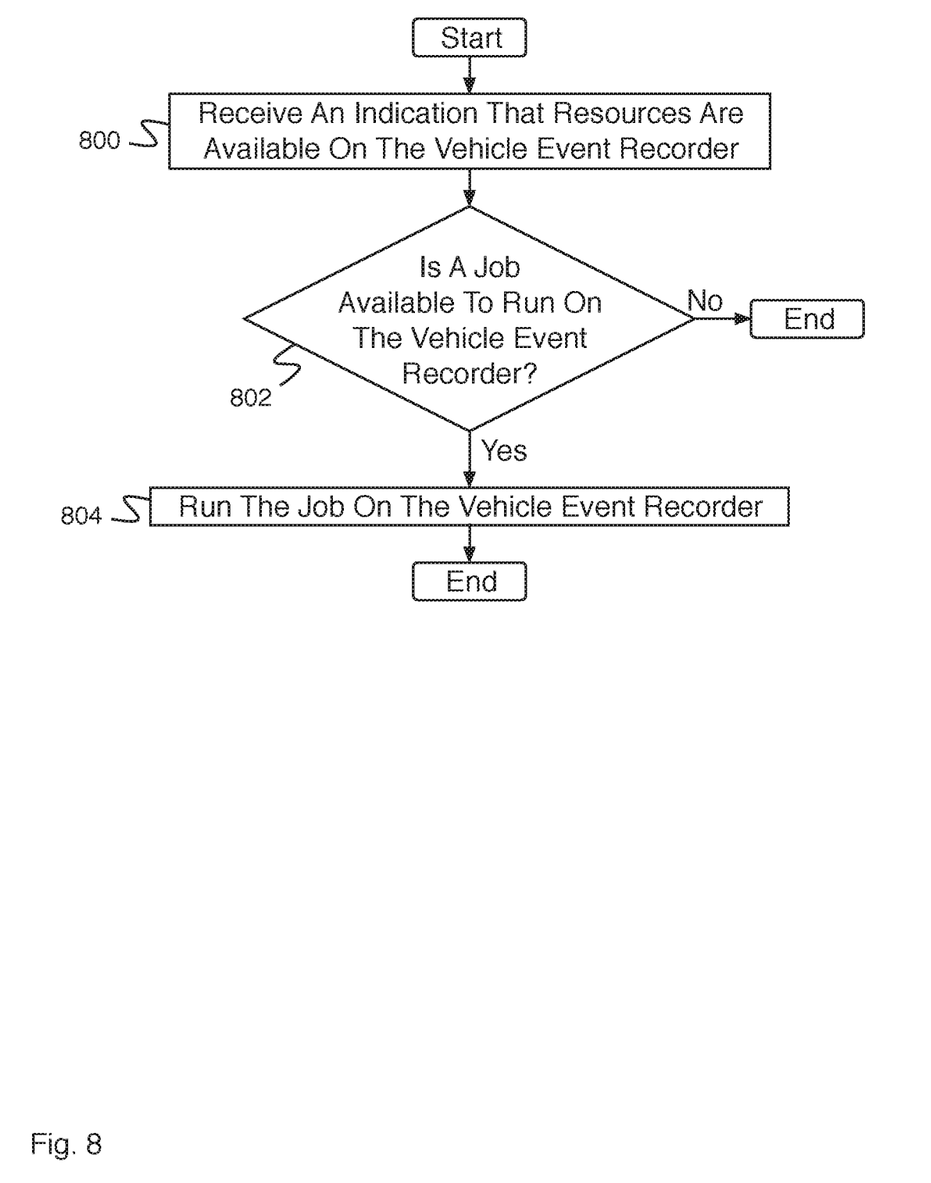
FIG. 8 is a flow diagram illustrating an embodiment of a process for transitioning a job to a vehicle event recorder.

FIG. 8 is a flow diagram illustrating an embodiment of a process for transitioning a job to a vehicle event recorder. In some embodiments, the process of FIG. 8 is executed by vehicle event recorder 102 of FIG. 1. In the example shown, in 800, an indication is received that resources are available on the vehicle event recorder. For example, the indication is received from a system monitoring process running on the vehicle event recorder. In 802, it is determined whether a job is available to run on the vehicle event recorder. For example, a job available to run comprises a job that has been indicated to run but not yet assigned a device to run on, a job that has been recently assigned to a vehicle carried system (e.g., such that restarting it on the vehicle event recorder will result in a minimum of wasted work), a job that has recently produced a portable checkpoint data file, etc. In the event it is determined that a job is not available to run on the vehicle event recorder, the process ends. In the event it is determined that a job is available to run on the vehicle event recorder, control passes to 804. In 804, the job is run on the vehicle event recorder. For example, the job is run (e.g., from its starting point) on the vehicle event recorder, or the job is transferred to the vehicle event recorder (e.g., including a portable checkpoint data file comprising a partially completed job state).

Figure 9:
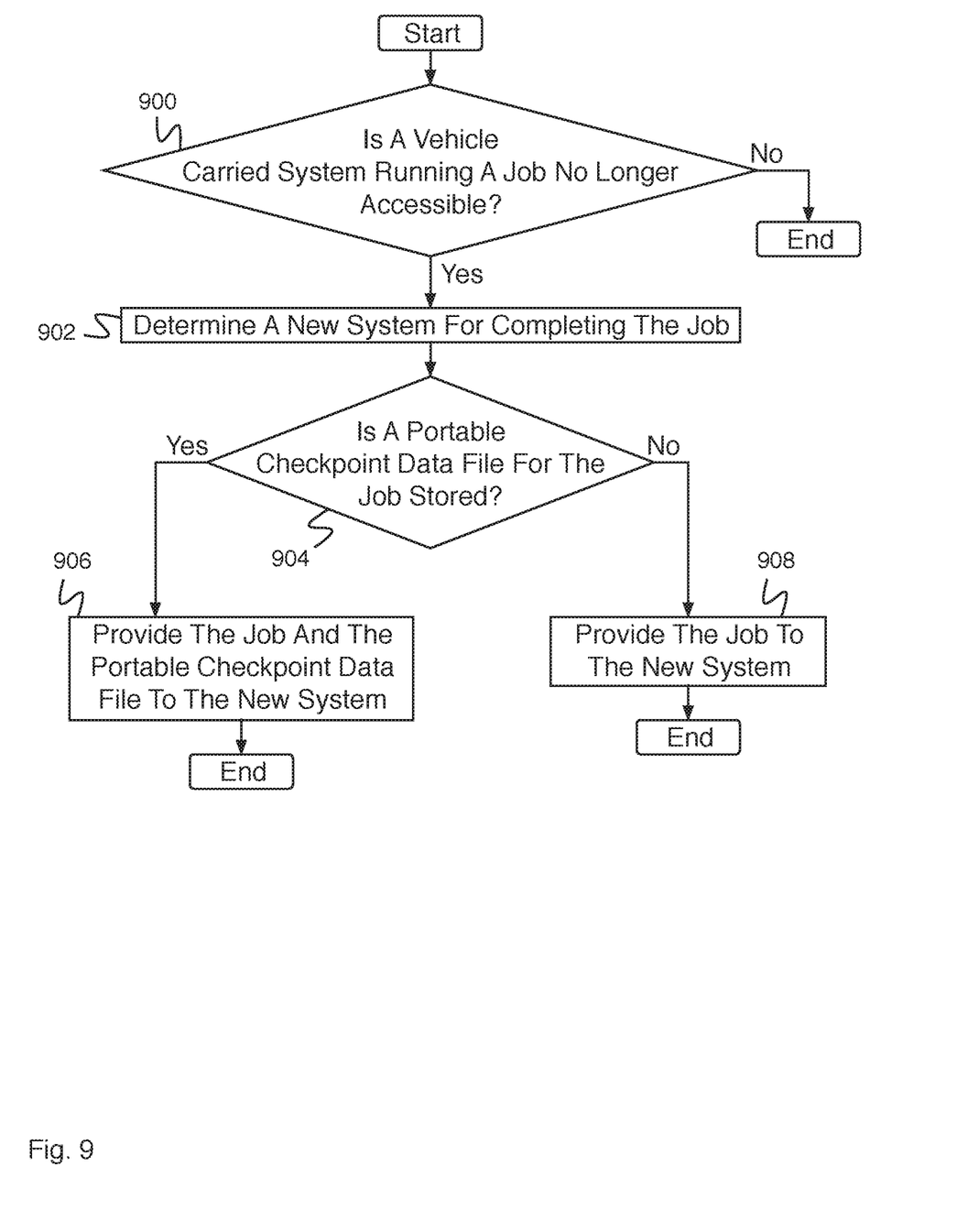
FIG. 9 is a flow diagram illustrating an embodiment of a process for transitioning a job from an inaccessible system.

FIG. 9 is a flow diagram illustrating an embodiment of a process for transitioning a job from an inaccessible system. In some embodiments, the process of FIG. 9 is executed by vehicle event recorder 102 of FIG. 1. In the example shown, in 900, it is determined whether a vehicle carried system running a job is no longer accessible. For example, determining that a vehicle carried system running a job is no longer accessible comprises determining that an expected vehicle carried system status update was not received. In the event it is determined that no vehicle carried system running a job is no longer accessible, the process ends. In the event it is determined that a vehicle carried system running a job is no longer accessible, control passes to 902. In 902, a new system for completing the job is determined. For example, a new system for completing the job is determined using a process similar to the process of FIG. 7. In 904, it is determined whether a portable checkpoint data file for the job is stored. For example, the portable checkpoint data file for the job comprises a record of job progress before the vehicle carried system running the job became inaccessible. In the event it is determined that a portable checkpoint data file for the job is stored, control passes to 906. In 906, the job and the portable checkpoint data file are provided to the new system, and the process ends. In the event it is determined in 904 that a portable checkpoint data file for the job is not stored, control passes to 908. In 908, the job is provided to the new system. For example, the job is started over on a new system.

Figure 10:
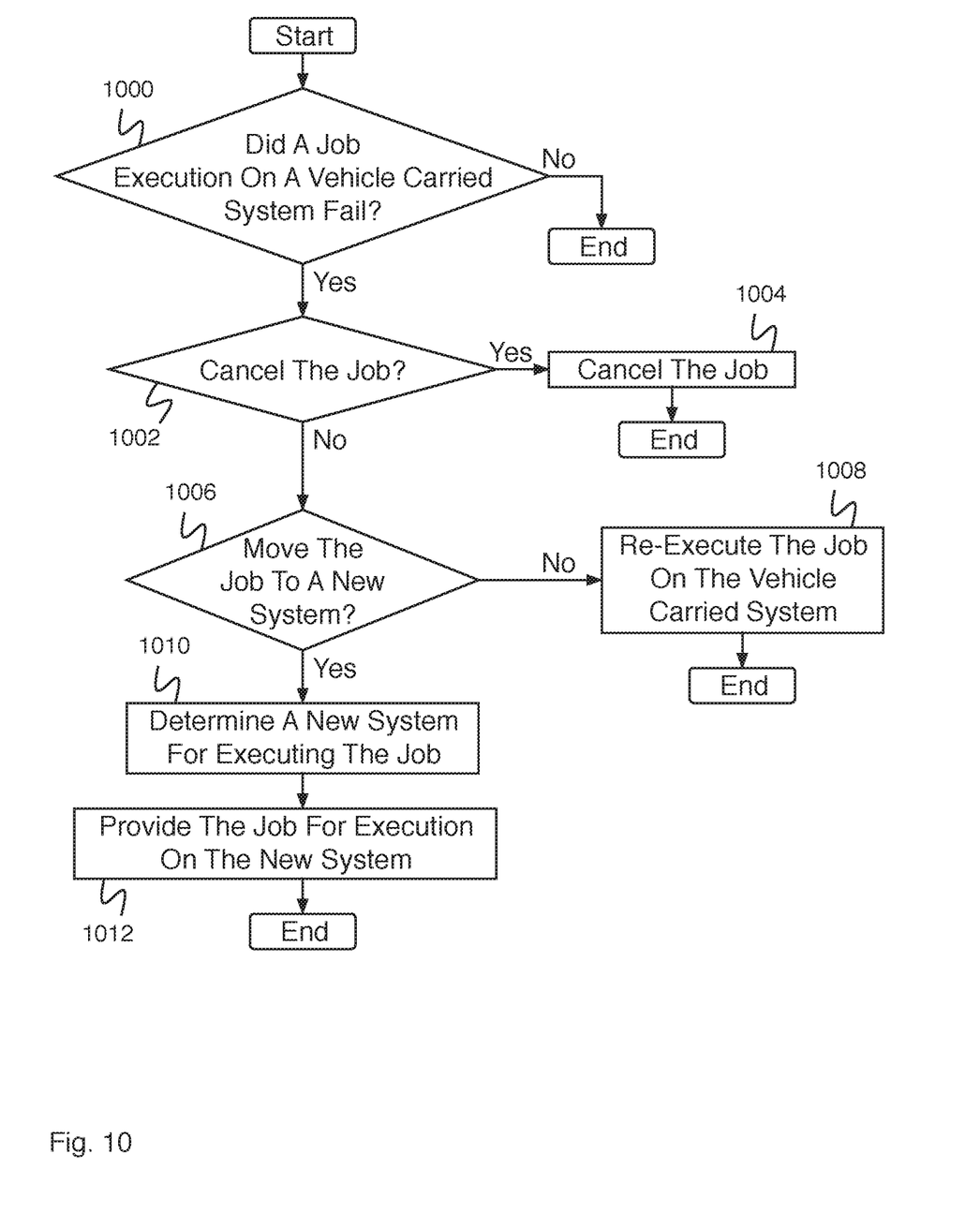
FIG. 10 is a flow diagram illustrating an embodiment of a process for responding to a job failure.

FIG. 10 is a flow diagram illustrating an embodiment of a process for responding to a job failure. In some embodiments, the process of FIG. 10 is executed by vehicle event recorder 102 of FIG. 1. In the example shown, in 1000, it is determined whether a job execution on a vehicle carried system failed. For example, determining that a job execution on a vehicle carried system failed comprises determining that a job execution failed indication has been received. In various embodiments, a job execution failed indication comprises one or more of a vehicle carried system identifier, a job identifier, a job most recent portable checkpoint data file, a determination of whether the job is likely to succeed upon retry, a determination of whether the vehicle carried system does not have the required capacity for the job, etc. In the event it is determined that a job execution on a vehicle carried system did not fail, the process ends. In the event it is determined that a job execution on a vehicle carried system failed, control passes to 1002. In 1002, it is determined whether to cancel the job (e.g., cancel the job and not re-attempt execution of the job). For example, it is determined to cancel the job because it was already completed by a different system, because completion of the job is no longer necessary, because partial completion of the job is satisfactory, because the indication from the vehicle carried system that the job execution failed included an indication that the job is likely to fail again upon retry, etc. In the event it is determined to cancel the job, control passes to 1004. In 1004, the job is canceled, and the process ends. In the event it is determined in 1002 not to cancel the job, control passes to 1006. In 1006, it is determined whether to move the job to a new system. For example, it is determined to move the job to a new system because another system is present with greater processing capacity, because another system is present and available, because the indication from the vehicle carried system that the job execution failed indicates that the job is likely to fail if run again on the same vehicle carried system, etc. In the event it is determined that the job should not be moved to a new system, control passes to 1008. In 1008, the job is re-executed on the vehicle carried system, and the process ends. In the event it is determined in 1006 to move the job to a new system, control passes to 1010. In 1010, a new system for executing the job is determined. For example, a new system for completing the job is determined using a process similar to the process of FIG. 7. In 1012, the job is provided for execution on the new system.

Figure 11:
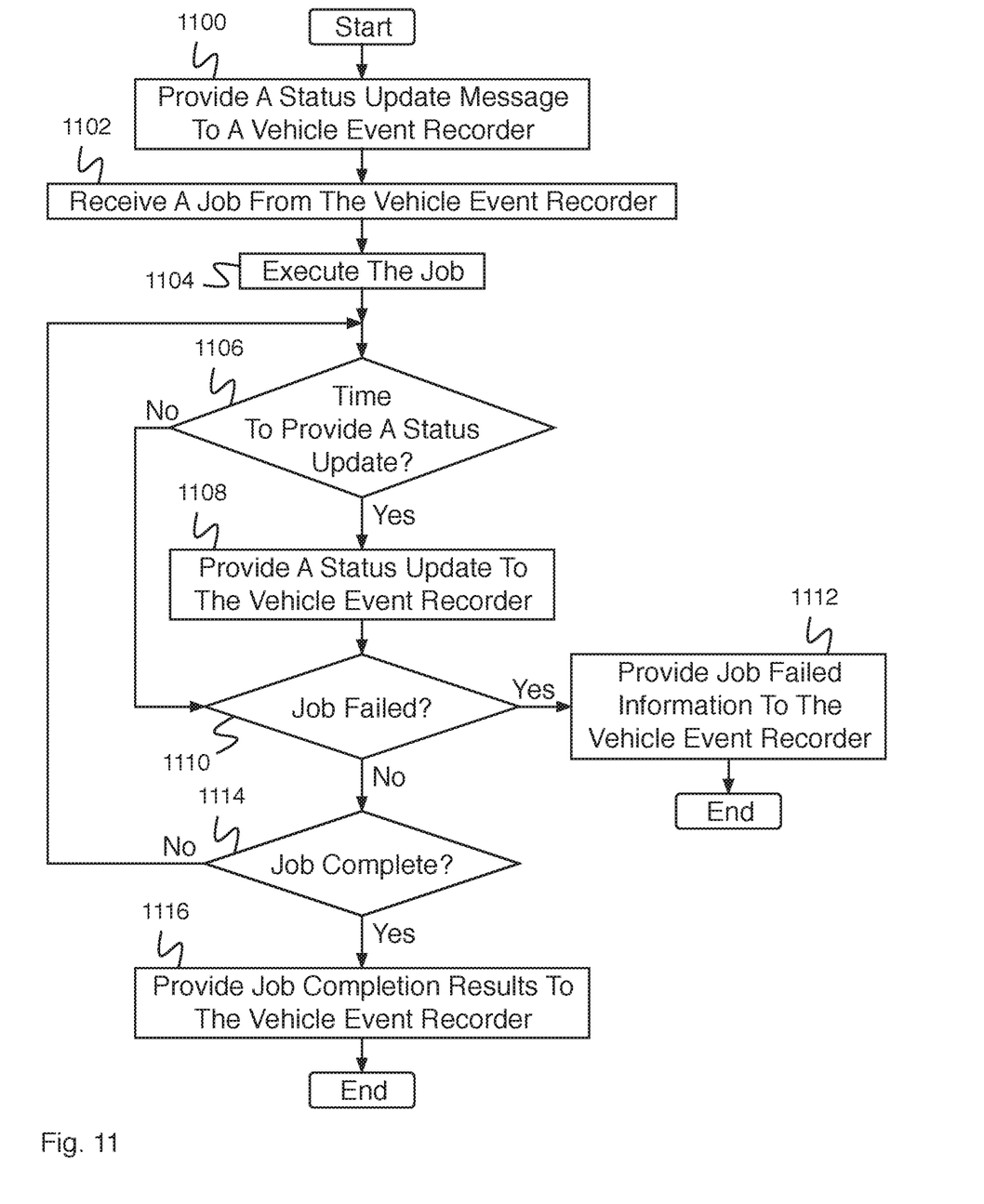
FIG. 11 is a flow diagram illustrating an embodiment of a process for a vehicle carried system.

FIG. 11 is a flow diagram illustrating an embodiment of a process for a vehicle carried system. In some embodiments, the process of FIG. 11 is executed by vehicle carried system 106 of FIG. 1. In the example shown, in 1100, a status update message is provided to a vehicle event recorder. For example, the status update message comprises one or more of a device identifier, a device type, a device location within a carrying vehicle, a device operating temperature, device CPU resource availability, device GPU resource availability, device DSP resource availability, device volatile memory capacity, device volatile memory availability, device non-volatile storage capacity, device non-volatile storage availability, device non-volatile storage security attributes, device jobs in progress list, device jobs in progress percentage complete, device jobs in progress checkpoint data files, or any other appropriate status message content. In 1102, a job is received from the vehicle event recorder. In some embodiments, the vehicle carried system idles and provides regular status update messages (e.g., once a second, once a minute, once every 10 minutes, once an hour, once every four hours, once a day, etc.) to the vehicle event recorder until a job is received from the vehicle event recorder. In 1104, the job is executed. In 1106, it is determined whether it is time to provide a status update. In the event it is determined that it is not time to provide a status update, control passes to 1110. In the event it is determined that it is time to provide a status update, control passes to 1108. In 1108, a status update is provided to the vehicle event recorder. For example, the status update comprises information on execution of the job (e.g., job percentage complete, job estimated completion time, a job portable checkpoint data file, etc.), in addition to any other appropriate status update information. In 1110, it is determined whether the job failed. In the event it is determined that the job failed, control passes to 1112. In 1112, job failed information is provided to the vehicle event recorder, and the process ends. In the event it is determined in 1110 that the job did not fail, control passes to 1114. In 1114, it is determined whether the job is complete. In the event it is determined that the job is not complete, control passes to 1106. In the event it is determined that the job is complete, control passes to 1116. In 1116, job completion results are provided to the vehicle event recorder.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for dynamic job shifting, comprising:
an interface configured to receive a job request to perform a job; and
a processor configured to:
monitor available resources for performing the job, wherein available resources comprise a set of vehicle carried systems accessible to a vehicle event recorder via a communication link, wherein the vehicle event recorder is coupled to a vehicle;
determine a vehicle carried system of the set of vehicle carried systems for performing the job;
provide the job to the vehicle carried system, wherein the job is configured to create one or more checkpoint data files; and
receive an indication of creation of a checkpoint data file of the one or more checkpoint data files, comprising to:
determine whether the vehicle carried system is no longer accessible; and
in response to a determination that the vehicle carried system is no longer accessible:
determine a new vehicle carried system of the set of vehicle carried systems for completing the job;
determine whether a portable checkpoint data file is stored, the portable checkpoint data file including a record of job progress before the vehicle carried system running the job became inaccessible and including data for allowing the job to be resumed on another vehicle carried system; and in response to a determination that the portable checkpoint data file is stored, provide the job and the portable checkpoint data file to the new vehicle carried system.

2. The system of claim 1, wherein the job can be transferred to the vehicle event recorder or run on the vehicle event recorder in response to vehicle event recorder resources being available.

3. The system of claim 1, wherein the communication link comprises a networking communication link of the vehicle event recorder.

4. The system of claim 1, wherein the interface is configured to receive a status update message from the vehicle carried system, wherein the status update message comprises one or more of a device identifier, a device type, a device location within a carrying vehicle, a device operating temperature, device CPU resource availability, device GPU resource availability, device DSP resource availability, device volatile memory capacity, device volatile memory availability, device non-volatile storage capacity, device non-volatile storage availability, device non-volatile storage security attributes, device jobs in progress list, device jobs in progress percentage complete, or device jobs in progress checkpoint data files.

5. The system of claim 1, wherein the vehicle carried system is determined based at least in part on an ability to complete the job.

6. The system of claim 1, wherein the vehicle carried system is determined based at least in part on an availability model.

7. The system of claim 1, wherein the vehicle carried system is determined based at least in part on a vehicle carried system processor load.

8. The system of claim 1, wherein the vehicle carried system executes the job using a secured virtual machine.

9. The system of claim 1, wherein the vehicle carried system executes the job using a user installed app.

10. The system of claim 1, wherein the vehicle carried system comprises a mobile system.

11. The system of claim 1, wherein the checkpoint data file of the one or more checkpoint data files comprises a non-portable data file for resuming the job on the vehicle carried system.

12. The system of claim 1, wherein the checkpoint data file of the one or more checkpoint data files comprises a job completion result.

13. The system of claim 1, wherein the processor is further configured to determine whether job execution on the vehicle carried system failed.

14. The system of claim 13, wherein the processor is further configured to, in response to determining that the job execution on the vehicle carried system failed, cancel the job, re-execute the job on the vehicle carried system, or execute the job on another system.

15. A method for dynamic workload shifting, comprising:
receiving a job request to perform a job;
monitoring available resources for performing the job using a processor, wherein available resources comprise a set of vehicle carried systems accessible to the vehicle event recorder via a communication link, wherein the vehicle event recorder is coupled to a vehicle;
determining a vehicle carried system of the set of vehicle carried systems for performing the job;
providing the job to the vehicle carried system, wherein the job is configured to create one or more checkpoint data files; and
receiving an indication of creation of a checkpoint data file of the one or more checkpoint data files, comprising:
determining whether the vehicle carried system is no longer accessible; and
in response to a determination that the vehicle carried system is no longer accessible:
determining a new vehicle carried system of the set of vehicle carried systems for completing the job;
determining whether a portable checkpoint data file is stored, the portable checkpoint data file including a record of job progress before the vehicle carried system running the job became inaccessible and including data for allowing the job to be resumed on another vehicle carried system; and
in response to a determination that the portable checkpoint data file is stored, providing the job and the portable checkpoint data file to the new vehicle carried system.

16. A computer program product for dynamic workload shifting, the computer program product being embodied in a non-transitory computer readable storage medium and comprising computer instructions for:
receiving a job request to perform a job;
monitoring available resources for performing the job, wherein available resources comprise a set of vehicle carried systems accessible to the vehicle event recorder via a communication link, wherein the vehicle event recorder is coupled to a vehicle;
determining a vehicle carried system of the set of vehicle carried systems for performing the job;
providing the job to the vehicle carried system, wherein the job is configured to create one or more checkpoint data files; and
receiving an indication of creation of a checkpoint data file of the one or more checkpoint data files, comprising:
determining whether the vehicle carried system is no longer accessible; and
in response to a determination that the vehicle carried system is no longer accessible:
determining a new vehicle carried system of the set of vehicle carried systems for completing the job;
determining whether a portable checkpoint data file is stored, the portable checkpoint data file including a record of job progress before the vehicle carried system running the job became inaccessible and including data for allowing the job to be resumed on another vehicle carried system; and
in response to a determination that the portable checkpoint data file is stored, providing the job and the portable checkpoint data file to the new vehicle carried system.

\* \* \* \* \*